Figure 8:
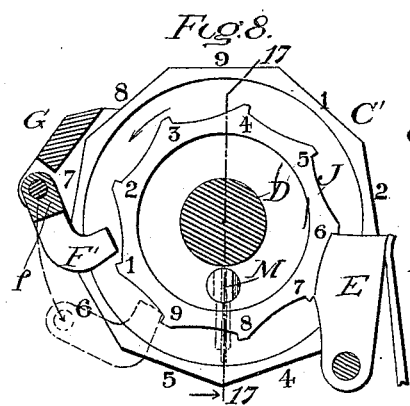

No. 807,094. PATENTED DEC. 12, 1905.
C. F. SMITH.
NUMBERING MACHINE.
APPLICATION FILED JAN. 7, 1905.
2 SHEETS—SHEET 1.
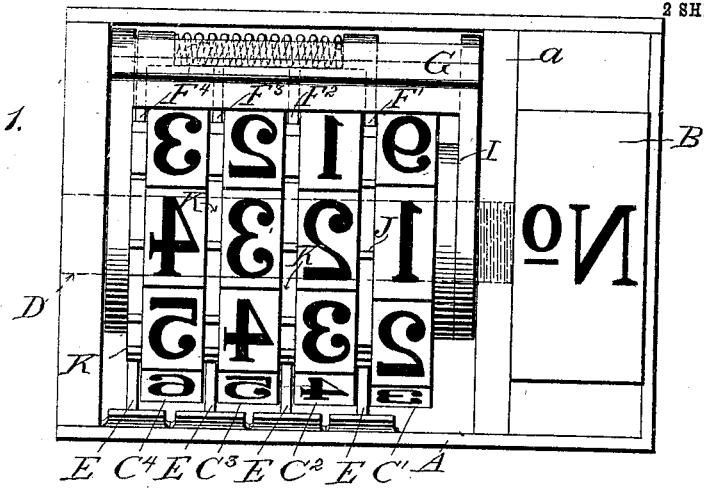
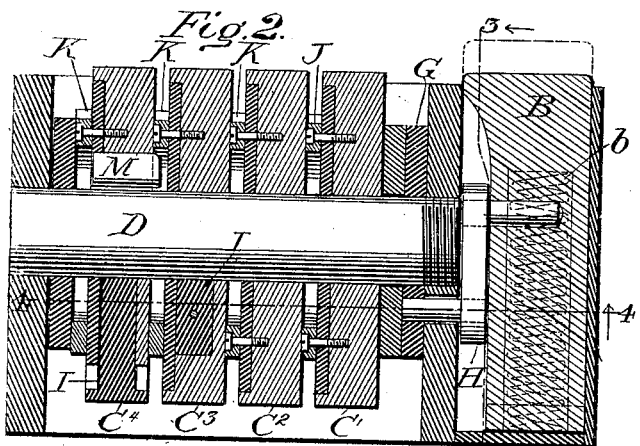
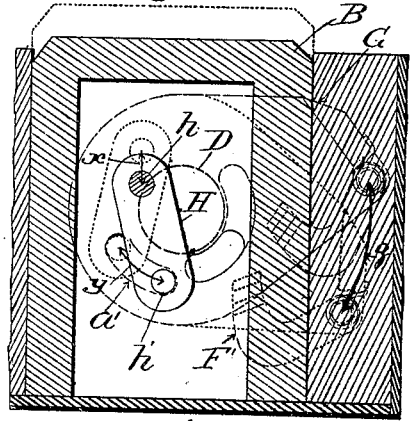
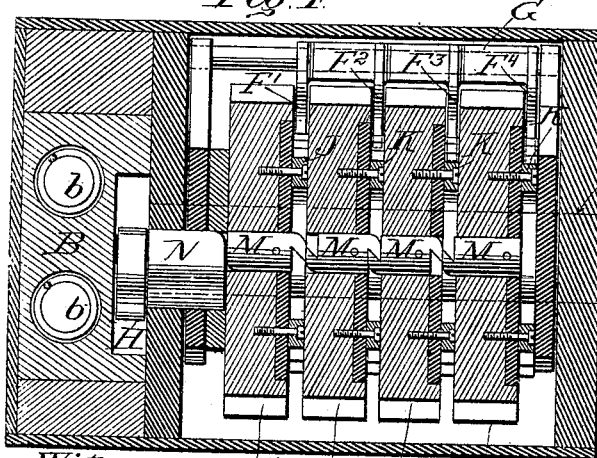
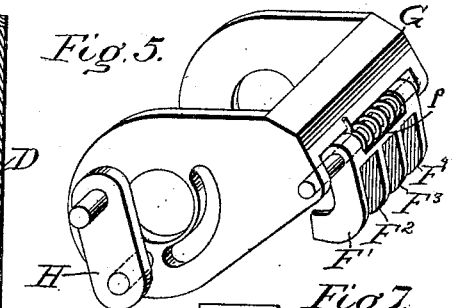
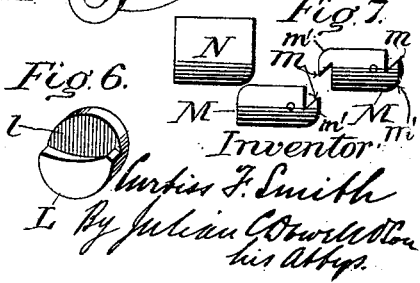
Witnesses:
Inventor
Curtiss F. Smith
By Julian C. Dowell
his Attys.

No. 807,094. PATENTED DEC. 12, 1905.
C. F. SMITH.
NUMBERING MACHINE.
APPLICATION FILED JAN. 7, 1905.

Witnesses
Inventor
Curtiss F. Smith

UNITED STATES PATENT OFFICE.

CURTISS F. SMITH, OF BROOKLYN, NEW YORK.

NUMBERING-MACHINE.

No. 807,094.      Specification of Letters Patent.      Patented Dec. 12, 1905.

Application filed January 7, 1905. Serial No. 240,088.

*To all whom it may concern:*

Be it known that I, CURTISS F. SMITH, a citizen of the United States, residing at Brooklyn, in the county of Kings and State of New York, have invented certain new and useful Improvements in Numbering-Machines; and I do hereby declare the following to be a full, clear, and exact description of the invention, such as will enable others skilled in the art to which it appertains to make and use the same.

This invention relates to consecutive-numbering machines in which a plurality of numbering wheels or disks are arranged coaxially and are automatically operated to change the numbers on the printing-line in regular sequence. It is particularly applicable to that class of numbering-machines, notably consecutive-numbering heads or typographic machines for printing-presses, in which the numbering-wheels are advanced by pawls carried by a swinging arm or swinging frame moved by a plunger, the head of which plunger in a typographic machine is normally above the printing-line and is depressed by the platen or impression-cylinder at each operation of the press. However, the broad features and improvements herein set forth, particularly the arrangement and mode of operation of the series of numbering-wheels, are susceptible of general utility and are applicable to other machines of similar or analogous character, whether typographic or hand or in the nature of counters, so that by the word "numbering-machine" I intend to embrace any and all machines or devices of the same genus or operating on the principle of turning the disks to form consecutive numbers, whether according to ordinary counting or otherwise.

The invention accomplishes the following important results:

First. The printing or numbering is done from left to right instead of from right to left, as in all prior consecutive-numbering machines—that is, the numerals after the units are formed by increasing the number of digits toward the right or outward from the prefix (which is usually the abbreviation or symbol "No.") instead of increasing the number of digits toward the left or toward the prefix, as in other machines. Consequently when a stationary prefix is employed (as distinguished from a sliding prefix, which is undesirable and involves complications) there is no space left between the same and the units or smaller numbers of the series which the machine is capable of printing.

Second. The wheel-controlling mechanism is simple in construction and accurate in operation notwithstanding its more complicated principle of action. Simplified and effective actuating mechanism is also provided, including improved means for obtaining an increased movement of the swing-frame which carries the actuating-pawls by a relatively slight depression of the plunger.

For further explanation of the chief object of the invention, which is the production of a practicable consecutive-numbering machine capable of printing the successive numbers by increasing the digits from left to right, the following remarks are submitted preliminarily to a description of the illustrated embodiment: Heretofore all numbering-machines, typographic and hand, have had a constant units-wheel, a constant tens-wheel, &c., operating on the simple principle of intermittent turn of a wheel of any denomination only the space of one step or figure for every complete rotation of the adjacent wheel of next lower denomination, the tens-wheel moving one step or notch for every rotation of the units-wheel, the hundreds-wheel moving one step for every rotation of the tens-wheel, and so on. This principle has necessitated making the units-wheel the last of the series or placing it farthest or outermost from the prefix. Hence in printing long series of numbers extending into the hundreds, thousands, &c., it has been essential to increase the number of digits toward the left, so that when using a prefix (excepting, of course, a sliding prefix) spaces have invariably been left between the prefix and the smaller numbers, thus:

No.     1
         No.     9
         No.    10
         No.   999
         No. 1000
         No. 99999.

My invention eliminates these undesirable spaces between the prefix and smaller numerals and allows the printing of a long series of numbers with the units or first digits thereof in vertical alinement, (reading on a printed sheet,) the principle of action of the numbering-wheels being changed so as to increase the digits toward the right in the following manner:

No. 1
No. 9
No. 10
No. 999
No. 1000
No. 99999.

The difficulties besetting such an accomplishment will be apparent when it is understood that in the new mechanism the *modus operandi* of the series of numbering-wheels is essentially such that the first wheel (the one nearest the prefix) acts initially as the units-wheel, turning one step or notch for every operation of the machine, (to print the numbers "1" to "9," inclusive,) the other wheels meanwhile remaining inoperative, whereupon the second wheel comes into action and serves as the units-wheel, while the first wheel now acts as the tens-wheel and turns only one step for every complete rotation of the second wheel, (to print from "10" to "99," inclusive,) whereupon the third wheel comes into action and serves as the units-wheel, while the second acts as the tens-wheel and the first acts as the hundreds-wheel, (to print from "100" to "999," inclusive,) and so on, according to the number of wheels in the series, each wheel being inconstant, changing its timing with every introduction of a new wheel into action and having its rate of intermittent movements per operation of the plunger diminishing according to the inverse of the geometrical progressive series "10," "100," "1000," &c., and determinate by the number of active wheels operating to its right. By my present invention this essential but hitherto ungained action of the numbering-wheels is attained without the introduction of complicated devices, but by simple and effective means, resulting in an accurate and practicable machine of equal compactness and approximately the same simplicity as the ordinary numbering-machines now in use. The periods of introduction of a new wheel and retiming of the other active wheels may appropriately be termed "reorganization periods," and they correspond, of course, with the times of printing the numbers "10," "100," "1000," and following multiples of ten of this progression. Now it is obvious that any group of active wheels during the interval between its reorganization periods operates on the same general principle of other numbering-machines having for the time being a constant units-wheel, a constant tens-wheel, &c., each of which in front of the units-wheel turns intermittently one step or figure for every complete rotation of the adjacent wheel of next lower denomination. This regular operation is conveniently performed by substantially similar mechanism to that now used in the art, (swing-frame with series of actuating-pawls of different lengths coacting with ratchets on the wheels each having one "deep notch,") suitably modified to meet the conditions of this new application, for my invention permits the ready adaptation of such mechanism to the present requirements and the incorporation therewith of the necessary devices for effecting the aforesaid changes or reorganizations which occur at the reorganization periods.

I shall now proceed with a more elaborate description, referring to the accompanying drawings, which form a part of this specification and which illustrate an embodiment of the invention in a typographic machine or consecutive-numbering head adapted to be "locked up" with a form of type in a printer's chase and operated automatically by the platen or impression-cylinder of the press or by cam movement. As before stated, the invention is susceptible of general application and capable of embodiment in other forms or types of machines, as well as modification in details of structure and arrangement of the mechanism. Hence the following description of the illustrated machine will be given without limitation to the embodiment or construction shown, and the invention will then be particularly pointed out, and defined in the appended claims.

Figure 9:
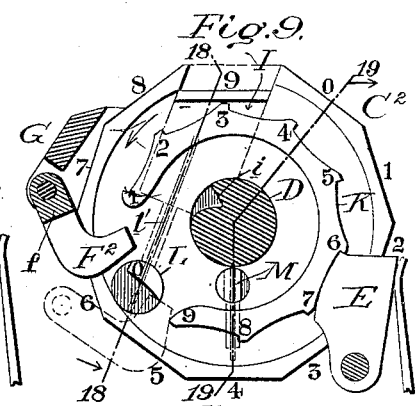
Figure 17:
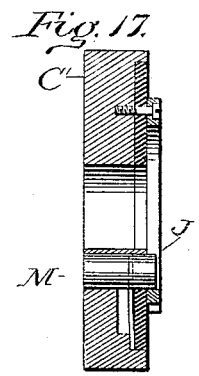
Figure 10:
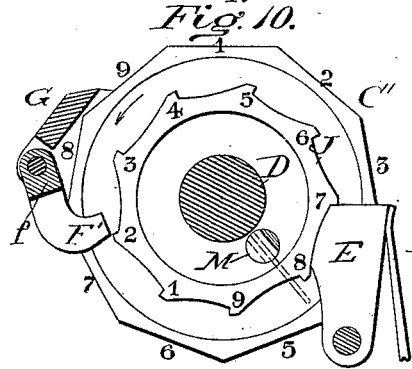
Figure 11:
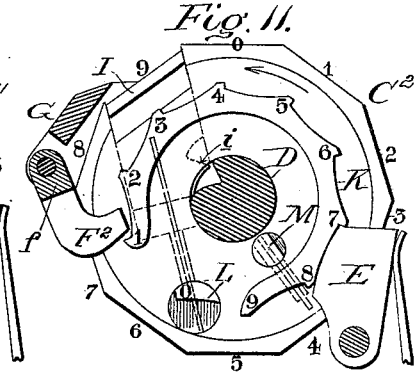
Figure 18:
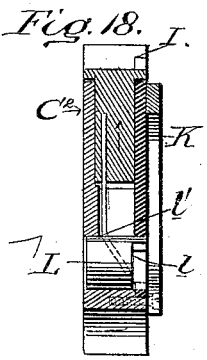
Figure 12:
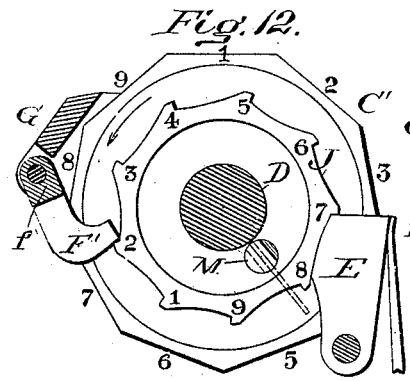
Figure 13:
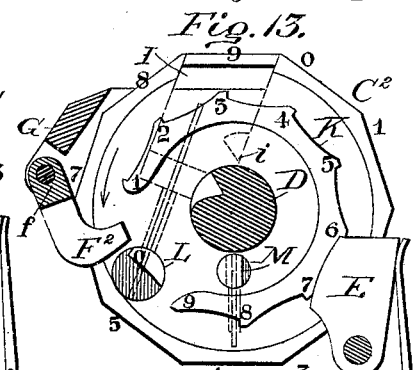
Figure 19:
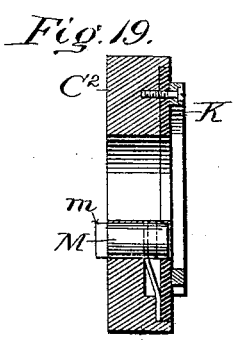
Figure 14:
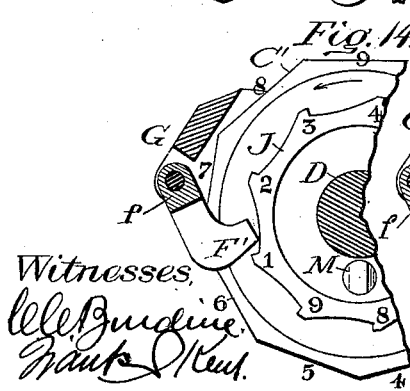
Figure 15:
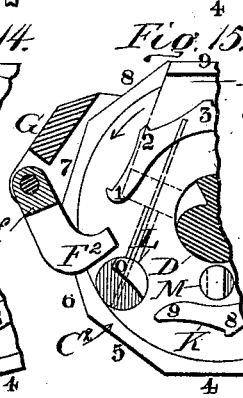
Figure 16:
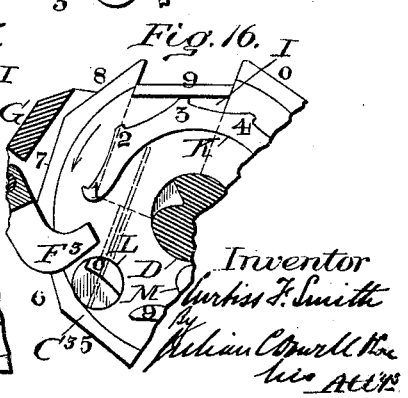

In said drawings, Figure 1 is a top plan view of the machine in its usual position for printing, showing its prefix-plate or plunger-head at the right and its changeable line of type at the left thereof, wherefore the impression is made with the prefix at the left and the printed number at the right. Fig. 2 is a central longitudinal vertical section of the same. Fig. 3 is a vertical cross-section on line 3 3 of Fig. 2 looking in the direction of the arrow, showing the plunger depressed, the motion-transmitting link in corresponding position, and representing by dash-lines the corresponding position of the pawl-carrying swing, also indicating by fine dotted lines the reverse position of all of such parts—that is, the position when the plunger is up. Fig. 4 is a horizontal section on line 4 4 of Fig. 2 looking from below, the parts being in the position assumed when the number "99" is up on the printing-line and "100" about to appear. Fig. 5 is a detail perspective view of the pawl-carrying swing and its link. Fig. 6 is a detail view of a so-called "dormant tooth," one of which is provided in the second and all following wheels. Fig. 7 is a detail view of a cluster of pins forming part of the mechanism for bringing the several wheels into action in their regular order. Figs. 8 and 9 are side views of the first and second wheels when the type or figure "9" is up for printing and the number "10" is about to appear on the printing-line looking at the ratchet sides of said wheels. Figs. 10 and 11 are similar views of said wheels when the number "10" is up for printing. Figs. 12 and 13 are similar views of said wheels when the number "19" is on the printing-line and "20" about to appear. Figs. 14, 15, and 16 are similar fragmentary views of the first, second, and third wheels when the number "99" is on the printing-line and "100" about to appear. Fig. 17 is a vertical cross-section on line 17 17 of Fig. 8 looking in the direction of the arrow. Figs. 18 and 19 are cross-sections respectively on lines 18 18 and 19 19 of Fig. 9 looking in the directions of the arrows.

A denotes the box or case of the machine, adapted to be locked up with other type to work in any platen or cylinder press in the usual manner. In one end of the box (the right-hand end when the machine sets with its printing-line up, as in Fig. 1) is a vertical chamber in which works in guides the vertically-reciprocating plunger B, spring-held up, so that its head or prefix-plate stands normally above the printing-line to be depressed by the platen or impression-cylinder at each operation of the press. The head of the plunger may bear any appropriate prefix-type, usually the abbreviation of the word "number" or symbol "No."

$C'$ $C^2$ $C^3$ $C^4$ indicate the series of numbering-wheels, of which four are shown, so that the illustrated machine is therefore capable of printing consecutive numbers from "1" to "9999," inclusive. For convenience I shall refer to these as the "first," "second," "third," and "fourth" figure-wheels. The first wheel $C'$ is adjacent to the plunger or at the inner end of the box, while the fourth or last wheel $C^4$ is at the outer end of the box, according to the nomenclature employed in this art. These wheels are loosely mounted on the fixed axial rod or center shaft D, which extends from the plunger-chamber to the outer end of the box. They are controlled or held steady by detents or spring-pressed dogs E engaging their respective ratchets, while permitting the ratchets to turn past said dogs in the proper direction. The numbering-wheels are actuated by a series of pawls or the pawl-teeth $F'$ $F^2$ $F^3$ $F^4$ of the actuating-pawl $f$, carried by a swing-frame G of usual form, comprising cheek-plates loosely hung or pivoted on the center shaft and connected by a cross-bar. The pawl $f$ is spring-pressed to cause said pawl-teeth to engage the corresponding wheel-ratchets on downward movement of the swing and to snap or yield past the ratchet teeth or notches on upward movement, though this arrangement may be reversed, as hereinafter specified. The pawls are of different lengths, the one for the first wheel's ratchet being the shortest and the following ones successively longer. Hence during a regular or constant operation of any group of active wheels in the interval between its reorganization periods only the longest pawl of the corresponding group of pawls can engage the then acting units-wheel's ratchet successively, while the next shorter pawl engages the then acting tens-wheel's ratchet only once in every ten movements, (when the long pawl engages in the deep notch of the acting units-wheel's ratchet,) while the second shorter pawl engages the then acting hundreds-wheel's ratchet only once in every hundred movements, (when both the other pawls engage simultaneously the deep notches of the ratchets of the units-wheel and tens-wheel,) &c., thus performing this well-known and regular action in the usual manner. In the present illustration the wheels turn in a direction from the printing-line toward the swing, as indicated by the arrows.

The mechanism as thus far described is practically similar to that common to other consecutive-numbering machines of the type illustrated in the drawings; so further comment is deemed unnecessary. Specific description will now be given of the novel devices, improvements, combinations, and reorganization of mechanism which constitute the present invention.

*Means for oscillating the swing.*—Any suitable means may be employed for oscillating the pawl-carrying swing or swing-frame G; but for this purpose I have devised improved mechanism of simple and effective construction and operation whereby a relatively slight depression of the plunger transmits an increased movement or oscillation to the swing to carry the actuating-pawls the required distance from one ratchet tooth or notch to another and friction is reduced by elimination of the usual cam action. In the illustrated machine depression of the plunger B throws up the swing G, whose units-wheel-actuating pawl simply yields or snaps past the ratchet of the corresponding units-wheel, whichever one of the series it may be, (all longer pawls, if any, to the left or outer side moving inoperatively, as hereinafter explained, and all shorter pawls, if any, to the right or inner side being held out of contact with their respective ratchets in the usual way,) and the spring-forced return or rise of the plunger throws down the swing, during which downward movement one or more of its pawls engage one or more of the ratchets and turn the respective wheel or wheels one notch or figure to change the number on the printing-line. This is not essential, but is simply the arrangement which at present I deem best suited to the requirements of the illustrated mechanism, which of couse may be modified to change the position or direction of oscillation of the swing. This being understood, the inner cheek-plate of the swing is pivotally connected to the vertically-reciprocatory plunger by a link H, shown nearly vertically disposed and movable in a vertical plane in a recess in the plunger adjacent to the inner wall $a$ of the plunger-chamber, said wall $a$ having, of course, a suitable slot $a'$ to accommodate and permit travel of the pivot-pin $h'$ connecting H and G. Now the plunger-pin or pivotal connection $h$ between H and B (which is preferably situated to the opposite side of the axis of the swing from its pawl-carrying cross-arm) can only reciprocate vertically, since it is controlled by the plunger, while the swing-pin $h'$ can only oscillate through an approximately horizontal arc, since it is controlled by the swing. Hence when the plunger is depressed the slight vertical travel of the plunger-pin $h$ imparts to the swing-pin $h'$ an increased angular movement, which movement is the oscillation of the swing, whose pawl-carrying arm consequently moves through the same angle as the swing-pin $h'$. Thus is the necessary oscillation of the swing and travel of the pawls attained by a slight depression of the plunger. In Fig. 3 the full lines show the link H, plunger-pin $h$, and swing-pin $h'$ when the plunger is depressed, the corresponding position of the swing being represented by the dash-lines, while the fine dotted lines indicate the positions of the same parts when the plunger is up. The lines $x$, $y$, and $z$ show graphically the relative travels of the plunger-pin, swing-pin, and pawl-carrying cross-arm, respectively.

*The drop characters.*—To permit imprint of the type or figures on the active group of wheels alone, (comprising the one acting as the units-wheel and all others to its right or inner side looking at Fig. 1,) or, in other words, to avoid impression of the characters on the printing-line which lie behind the numbers to be printed, the second, third, and all following wheels have each one depressible type or drop character, these being the figures "9" in this instance since at the outset all the nines on the second and following wheels stand on the printing-line, as hereinafter explained. In this mechanism the so-called "drop-type" or movable type-block, together with its coördinated parts in the center shaft and wheels, is of an improved construction, devised for two functions; first, its customary function of avoiding impression of the character until raised to the printing-surface, but without the usual liability to injury by impact and wear heretofore characteristic of such devices; second, to coöperate with certain associated devices, as hereinafter explained, for effecting the reorganization of mechanism involved in carrying out the chief object of the invention—namely, the consecutive printing by increase of digits from left to right. To these ends the said depressible characters are formed or carried upon oblique or inclined blocks I, (see Figs. 9, 11, 13,) movably fitted in slots which are not radial, but are rather tangential, to the center shaft or inclined from the periphery or printing-line in the direction of rotation to one side of the shaft, in which is formed a longitudinal reentrant angular notch, interfitted with the counterformed feet $i$ of the blocks when depressed, as shown in Fig. 9. It is noted that the upper part of the shaft is left solid, while the foot $i$ of the block is substantial and free from sharp angles or slender edges. Now when any one of the wheels $C^2$ $C^3$ $C^4$ is moved to bring its cipher (which is the figure after the drop "9") into printing position, the bottom of the foot $i$ rides against the bottom of the notch, which is preferably curved to afford the requisite easy cam action, and then on the surface of the center shaft, thus forcing the block outward to bring the "9" to the same surface as the other figures in the usual manner. Thereafter the foot $i$ is supported on the center shaft, and it has a curved bottom of substantial width affording a practicable bearing. When the wheel makes a complete rotation, bringing the drop "9" into printing-line again, this substantial foot $i$ rests bodily upon the upper solid part of the shaft instead of by a slender toe on an overhanging side of a notch, thus affording a suitable bearing to sustain impact on the type from the platen or impression-cylinder. The block I can be depressed in the usual manner before starting the initial printing of the machine by turning the wheel nearly to the position shown in Fig. 11 and then moving it reversely to allow forcing down the block and seating or engagement of its foot in the notch of the center shaft.

The improved drop-type construction thus described is not specifically claimed *per se* herein, but forms the subject-matter of a divisional application filed by me August 26, 1905, Serial No. 275,943.

*The numbering-wheels and mechanism.*—In considering the numbering-wheels $C'$ $C^2$ $C^3$ $C^4$, &c., it will be remembered that they are inconstant and that each wheel in regular succession, beginning with the first, which is adjacent to the prefix or plunger, acts initially as a units-wheel, then as a tens-wheel, then as a hundreds-wheel, &c. Each time a new wheel (always the adjacent one to the left or outer side of the acting units-wheel of any active group) is introduced into action to start as the units-wheel for a new group the timing of the other wheels is changed or diminished according to the inverse of the geometrical progressive series "10," "100," "1000," &c., the former units-wheel now becoming the tens-wheel, the former tens-wheel now becoming the hundreds-wheel, and so on, according to the number of wheels in the said active group. These periods of retiming and introduction of a new wheel (occurring simultaneously with the appearance of the numbers "10," "100," "1000," &c., on the printing-line) I have appropriately termed "reorganization periods," as previously stated. It will also be remembered that the operation of any active group of wheels during the interim between its said reorganization periods is regular or according to a constant law, as in other numbering-machines, said group having for the time being a constant units-wheel, a constant tens-wheel, &c., each wheel in advance of the units-wheel making an intermittent turn only the space of one figure or ratchet-notch for every complete rotation of the adjacent wheel of next lower denomination, and I have already explained how this operation is performed by practically similar mechanism to that already used in the art, comprising the swing G with its pawl, having the series of pawl-teeth of different lengths, the longest of which engages successively the ratchet of the acting units-wheel at every oscillation of the swing, while the next shorter engages the ratchet of the tens-wheel only once in ten movements by virtue of engagement of said longest pawl in the "deep notch" of the units-wheel's ratchet, &c. In Figs. 8 to 10, inclusive, of the drawings for convenience the several type or characters on the peripheries of the wheels are designated according to the figures or digits printed therefrom, ("1, 2, 3, 4, 5, 6, 7, 8, 9, 0,") and the teeth or notches of the ratchets are also indicated by the figures which appear on the printing-line when the notches so designated are engaged by the actuating-pawls. For example, when an actuating-pawl engages the notch marked "8" of any ratchet the ensuing movement of the wheel will bring the type "8" into the printing-line. The first digit-wheel C' bears the type or figures "1" to "9," inclusive, but no cipher, nor has it any drop character. Its ratchet J is a ring with nine approximately equidistant teeth or notches, and it has no deep notch. This wheel when acting at the outset as the units-wheel (starting with the "1" up) simply turns eight steps or figures in succession, bringing its "2," "3," "4," "5," "6," "7," "8," and "9" consecutively into the printing-line, its ratchet being successively engaged by its pawl-tooth F' on the successive downward movements thereof. Meanwhile the second and all following wheels (whose nines are on the printing-line, but depressed) remain idle by reason of inoperative travel of their respective pawl-teeth in vacant spaces in their ratchets, which are not complete, but are mutilated. When the second wheel comes into action as the units-wheel, (by means explained later,) it is likewise successively moved step by step by its actuating-pawl, (the aforesaid vacant space in its ratchet having now been half restored or supplied by the protrusion or forthcoming of an erstwhile "dormant tooth," still leaving, however, one deep notch in said ratchet.) The first wheel now becomes the tens-wheel, moving only one step per ten steps or complete rotation of the second wheel, since the first shortest pawl F' is held inoperatively off from its ratchet by reason of the engagement of the second longer pawl F² on the second ratchet except when said second pawl engages in the deep notch of said second ratchet and allows the first pawl to move once into engagement with the first ratchet, and thus turn the first or now tens wheel one step. The same principle is carried on throughout the complete run or counting of the machine, the first wheel becoming the hundreds-wheel when the second becomes the tens-wheel, and so on. When acting as the hundreds-wheel, said first wheel turns only one step per hundred operations, since its pawl is held out of engagement with its ratchet except when both the second and third pawls engage in the deep notches of their respective ratchets, which happens but once in every hundred operations, which action is well understood by those familiar with this art. The second and all following wheels C² C³ C⁴, &c., (of which there may be any desired number, according to whether the machine is designed to print into the thousands, millions, or what not,) are alike, and each bears the ten type or figures "1, 2, 3, 4, 5, 6, 7, 8, 9, 0," of which the "9" is the drop character. As before stated, at the outset all the drop "9" are on the printing-line and depressed, as in Fig. 9. The ratchets K of these wheels are mutilated rings, as aforesaid, each having a vacant space equal or approximately equal to the space or distance of two teeth or notches, which vacant spaces allow the free inoperative travel or up-and-down movement of the respective actuating-pawls therein, (except when partially restored by the protrusion or forthcoming of the said erstwhile dormant tooth,) so that none of the other wheels are actuated while the first acts as the units-wheel, nor is any wheel or group of wheels actuated while the wheel to the inner side or right thereof (looking at Fig. 1) acts as the units-wheel. What I call the "dormant tooth" (since it remains dormant until brought into being, as it were) is a pin L, contained within the body of each of the second and all following wheels during inaction thereof, but adapted to "appear" or protrude to the side and supply half the aforesaid vacant space or one absent notch of the mutilated ratchet when the wheel comes into action, whereafter the ratchet is similar to any ordinary ratchet having one deep notch, so that it may be engaged and turned intermittently by its pawl at the proper periods. The said dormant tooth or pin L may itself be a mutilated pin, as seen more clearly in Fig. 6, having a segment or part cut away from its "appearing" or protruding end, as at $l$, such cut-away part being disposed outward or peripherally of the ratchet simply for the purpose of affording a seat for the actuating-pawl at the ratchet tooth or notch marked 1; but obviously any other suitable construction may be adopted for this purpose. In the illustrated mechanism the dormant tooth supplies or takes the place of the absent notch necessary for turning the wheel to bring its cipher into the printing-line and is therefore disposed so as to protrude into the far or lower part of the vacant space (looking from the printing-line in the direction of rotation;) but this arrangement, while explained here for specific description, is capable of modification where the mechanism is differently organized or where perhaps the characters on the wheels are changed. I shall now explain the illustrated devices for bringing the dormant tooth into existence, it being understood that various means may be contrived for this purpose. Each drop type or block I bearing the depressible "9" has rigidly attached thereto a bent rod $l'$, the bent or inclined part of which fits loosely in an inclined hole therefor in the dormant tooth or pin L. (See Fig. 18.) When said drop-type is depressed, the dormant tooth is also retracted or dormant in the body of the wheel; but as the wheel is first brought into action (by means presently to be explained) its drop-type is elevated by the center shaft, as already understood, and thus lifts said rod $l'$, whose bent or inclined part thus forces outward the dormant tooth on the well-known elementary principle of the inclined plane. This is the second function of the drop-type mentioned in the previous description of the depressible "9's." Now it is understood that after the dormant tooth of any wheel has come into being the ratchet is practically the same as any ordinary ratchet with one deep notch, so that the wheel is intermittently moved by its actuating-pawl at the proper periods, either once per operation, once per ten operations, &c., according to whether the wheel is acting as the units-wheel, tens-wheel, &c., while the adjacent inner wheel of next lower denomination is moved only one step for every complete rotation of its fellow or adjacent outer wheel, when the actuating-pawl of said outer wheel engages in the deep notch, thus operating any group of active wheels in the interval between its reorganization periods in the same manner as the ordinary operation of a set of constant numbering-wheels in other machines, as previously explained. By the term "dormant tooth" I intend to include any means whatever for supplying the place of an absent tooth or notch in the wheel-ratchet.

Explanation will now be made of the illustrated mode of bringing the second, third, and following wheel or wheels successively into action, it being understood that various means may be devised for performing this function, especially since it is independent of the operation of the "dormant teeth." (See Figs. 4 and 7 to 16, inclusive.) Each wheel, including the first wheel, has a transversely-movable pin M spring-pressed to protrude at the inner side of the wheel or toward the prefix, but adapted to be forced outward to protrude at the opposite or outer side. These pins are correspondingly located in all the wheels, so that they are in alinement when all the nines are on the printing-line. The adjacent or confronting ends of all the pins have opposed catches $m$, the backs of which are rounded or beveled, as at $m'$. (Shown in Fig. 7.) The several pins may conveniently be referred to as the first, second, third, and fourth movable pins, corresponding to the respective wheels in which they are placed. At the inner end of the box projecting from the wall $a$ of the plunger-chamber and through a suitable clearance-slot therefor in the adjacent cheek-plate of the swing is a fixed pin N, protruding into the circular path of travel of the first movable pin M, projecting from the inner side of the first wheel $C'$ and located so as to engage said first pin M and force it outward or project it at the opposite or outer side of said first wheel whenever rotation thereof brings its type or figure "9" up on the printing-line, the meeting edges of said movable pin M and fixed pin N being appropriately beveled, inclined, or rounded to allow the movable pin to ride yieldingly onto the fixed pin. The fixed pin N is also of suitable width or size to hold the movable pin M projected outward during the next movement of the first wheel, which brings the type or figure "1" thereof to the printing-line. Now, therefore, when the first wheel has printed the first eight digits and brings up its figure "9" to the printing-line its pin M protrudes at its outer side, and the next step or turn of said first wheel (to bring its figure "1" to the printing-line) will cause its said pin to catch or engage the second pin M projecting from the inner side of the second wheel, and thus carry around said second wheel the distance of one step or figure. Thereupon the second wheel (whose drop-type has been raised and whose dormant tooth has come into being by this movement) becomes the units-wheel and is successively moved step by step by its actuating-pawl $F^2$, while the actuating-pawl $F'$ is held out of engagement with the ratchet of the first wheel, except when the pawl $F^2$ engages in the deep notch of the second wheel's ratchet. Meanwhile the first pin M in the first wheel has withdrawn or sprung inward, so that it never interferes with the travel of the pin in the second wheel while the latter is printing the units-digits. Now when the numbers as far as "98" have been printed (and "99" about to appear on the printing-line) the first wheel with its figure "9" up has its pin M projected outward as aforesaid, and the next turn or movement of the second wheel (now the acting units-wheel) will cause its inward projecting pin to ride yieldingly end to end onto the end of said outward-projecting first pin of the first wheel, thus forcing said second pin also outward. Hence at the next operation (to bring "100" on the printing-line) the second, now outward-projecting, pin will catch the third inward-projecting pin in the third wheel, and thus carry around said third wheel the distance of one step or figure, bringing its cipher up and its dormant tooth into being in exactly the same manner as before. Thereupon the third wheel becomes the units-wheel, the second the tens-wheel, and the first the hundreds-wheel, as fully explained.

*Summary of the operation.*—The operation of the machine will be well understood from the foregoing description in connection with the drawings and will therefore be briefly summarized here, with reference more particularly to Figs. 8 to 16, inclusive, it being remembered that in the illustrated machine the wheel-ratchets are engaged by their respective actuating-pawls $F'$ $F^2$ $F^3$ $F^4$ on downward movement of the swing G, which occurs when the platen or impression-cylinder of the press leaves the type and allows the plunger B to rise. Printing from "1" to "9," inclusive, the first wheel $C'$ (starting with its "1" up, as in Fig. 10) simply makes eight intermittent turns in succession by the repeated engagement of its ratchet by its actuating-pawl $F'$, all the other pawls meanwhile traveling inoperatively in the vacant spaces of the mutilated ratchets of all the other wheels. Figs. 8 and 9 show the first and second wheels $C'$ $C^2$ and coacting parts when the figure "9" of the first wheel is up and the number "10" about to appear on the printing-line. The second and each of the remaining wheels likewise has its figure "9" lying in the printing-line, but depressed, this figure being the drop character. The pin M in the first wheel is now projected outward (by reason of engagement by the fixed pin N in the box) so that upon the next movement of said first wheel its said pin will catch the inward-projecting pin of the second wheel, and thus carry around the second wheel one step, bringing its cipher on the printing-line. Thus is the number "10" brought up at the first reorganization period of the operation. The positions of the first and second wheels at this period are represented in Figs. 10 and 11. The second wheel, having now come into action, has had its "drop" 9 raised or nearly raised to the periphery and its dormant tooth L has come into being or supplied one of the absent notches in the ratchet. The second actuating-pawl $F^2$ is shown engaging the tooth or notch marked 1 of the second wheel-ratchet, and is about to turn said wheel to bring its type or figure "1" on the printing-line, while the first actuating-pawl $F'$ is held off from the first wheel-ratchet. The second wheel is now the units-wheel and is turned step by step at each downward movement of its actuating-pawl. The first wheel, initially the units-wheel, is now the acting tens-wheel, and it turns only one step at every complete rotation of the second wheel, or every time the second wheel brings its cipher on the printing-line, which is effected by engagement of the second pawl $F^2$ in the deep notch (designated 0) of the second wheel-ratchet, permitting the first pawl $F^2$ to move in and operatively engage the first wheel-ratchet once. Thus the operation of printing the numbers from "10" to "99," inclusive, will be understood, the principle of action and means employed in this interval between the first reorganization period and the second period, occuring at "100," being practically similar to that already availed of in the art. Figs. 12 and 13 show the first and second wheels with the number "19" in the printing-line and "20" about to appear. The second pawl $F^2$ is engaging in the deep notch 0 of the second wheel-ratchet and the first pawl $F'$ is engaging the notch or tooth 2 of the first wheel-ratchet, as just explained. Figs. 14, 15, and 16 show the first, second, and third wheels $C'$ $C^2$ $C^3$ when "99" is on the printing-line and "100" about to appear. The second pawl $F^2$ is engaging in the deep notch of the second wheel-ratchet, allowing the first pawl $F'$ to engage the first wheel-ratchet, so that both wheels will make the next movement together. The first pin M in the first wheel $C'$ is projected outward, thus also forcing outward the second pin M in the second wheel $C^2$, so that upon the following united movement of said wheels $C'$ $C^2$ the said second pin will catch the third pin M in the third wheel $C^3$, and thus carry around said third wheel to bring up its cipher. Thus is the number "100" brought onto the printing-line, and this is the second reorganization period of the operation. The third wheel $C^3$ is now the units-wheel, the second the tens-wheel, and the first the hundreds-wheel. Thereafter the said third wheel is successively moved step by step, while the second wheel is turned by its actuating-pawl only one step for every ten operations, when the third pawl engages in the deep notch of the third wheel-ratchet, and the first wheel is turned by its actuating-pawl only one step in every hundred operations, when both the second and third pawls simultaneously engage in the deep notches of the second and third wheel-ratchets. The same principle extends throughout the entire operation of the machine whatever the number of digit-wheels, the operation of any active group of wheels during the interval between its reorganization periods being the same as in other consecutive-numbering machines of this character, and the machine undergoing reorganization at such periods (occurring simultaneously with the appearance of the numbers "10," "100," "1000," &c., on the printing-line) by the introduction of a new wheel into the group as the units-wheel and the retiming of the other wheels, according to their respective locations.

Before leaving this description it is desirable to refer to a slight matter of nicety of construction, which, however, is important for insuring proper alinement of the numbers "10," "100," "1000," &c., on the printing-line. It has been noted that the first wheel-ratchet J has nine notches, while all the following ratchets K have ten notches. Hence should the notches of the first ratchet be equidistant, as are those of the following ratchets, then at every period when the first wheel moves in unison with one or more of the other wheels it would make a one-ninth turn, while the other acting wheels would make a one-tenth turn. Now on account of the pins M it is necessary that when they are engaged or stand end to end and are forced outward by the box-pin N all the wheels should have the same angular movement, or one-tenth of a revolution, in order to keep the pins in the same relation. For this reason I preferably construct the first ratchet with the spaces between its teeth or notches 9 to 1 and 6 to 7 of the same pitch or angular distance as the spaces between the notches of the following ten-notched ratchets, so that in moving from "9" to "1" the first wheel makes the same turn as all the other acting wheels, while the corresponding teeth 5 to 6 are spaced the same for the retaining-detent E. Otherwise the first wheel in moving from "9" to "1" would carry its pin M the distance of one-ninetieth of a revolution farther than desired unless the pin M in the first wheel were set back four degrees, which would enable the ratchet J to have equidistant teeth and yet accomplish the desired end, and this may be adopted, if preferred, as an alternative construction. Where the ratchet J is constructed as here described, the remaining teeth thereof may be equally spaced, and the difference is so slight that the whole number of teeth are approximately equidistant.

I claim as my invention and desire to secure by Letters Patent of the United States—

1. A numbering-machine having, in combination, a type mechanism, and actuating mechanism operating said type mechanism to print consecutive numbers by increasing the number of digits from left to right.

2. A numbering-machine having, in combination, a type mechanism, a prime mover, and actuating mechanism operated by the successive movements thereof for successively changing the type to print consecutive numbers with digits increasing always from left to right.

3. A numbering-machine having, in combination, a changeable type which prints consecutive numbers by increasing the number of digits from left to right, and actuating mechanism therefor.

4. A numbering-machine having, in combination, an automatically-changeable type or printing line whose number of figures increases outward from the initial figure of the higher numbers, and actuating mechanism therefor, whereby the consecutive impressions made from such type have their number of digits increasing from left to right.

5. A numbering-machine having, in combination, a consecutively-changing type or printing line whose number of figures increases outward from the initial figure of the higher numbers, an automatic actuating mechanism therefor, whereby the impression of consecutive numbers is effected by increasing the number of digits from left to right.

6. A numbering-machine having, in combination, a type mechanism, a prime mover, and actuating mechanism operated thereby which at every operation shifts the type to change the numbers consecutively, the number of figures on the type-line being increased outward from the initial figure of the highest number.

7. A numbering-machine having, in combination, a changeable type-line, an actuating mechanism operating the same to print consecutive numbers with the initial or left-hand figure of each successive number in vertical alinement with respect to previous impressions.

8. A numbering-machine having, in combination, a fixed or non-sliding prefix-type, numbering-type for printing successively impressions of consecutive numbers after the prefix without spaces between the prefix and any number of the series, and actuating mechanism therefor.

9. A numbering-machine having, in combination, a fixed or non-sliding prefix-type, an associated changeable type mechanism, and actuating mechanism therefor controlling said type mechanism to print consecutive numbers by increasing the number of digits outward from the prefix.

10. A numbering-machine having, in combination, a fixed or non-sliding prefix, a changeable type-line controlled to bring consecutive numbers onto the printing-line with the initial figure of every number adjacent to the prefix, and actuating mechanism therefor.

11. A numbering-machine having, in combination, a plurality of numbering-wheels arranged to form consecutive numbers all beginning at one and the same wheel, and actuating mechanism therefor.

12. A numbering-machine having, in combination, a plurality of numbering-wheels arranged to form consecutive numbers all beginning at the first wheel of the series and increasing their number of digits at the tens, hundreds, &c., periods toward the last wheel of the series, and actuating mechanism therefor.

13. A numbering-machine having, in combination, a plurality of at least two numbering-wheels, means for actuating the first wheel to form the units-figures of a series of numerals all of which have the same number of digits, means for actuating the second wheel to form the units-figures of the following series of numerals having an extra digit, and means for actuating the first wheel to form the tens-figures of the latter series.

14. A numbering-machine having, in combination, a series of numbering-wheels for forming consecutive numbers, actuating mechanism, means for bringing the wheels in order into action as units-wheels at the periods of forming the numbers 10, 100, 1000, &c., and means effectively operating at such periods for retiming the previously-active wheels in order from the acting units-wheel according to the series $\frac{1}{10}$, $\frac{1}{100}$, $\frac{1}{1000}$, &c.

15. A numbering-machine having, in combination, a series of numbering-wheels for forming consecutive numbers, actuating mechanism, and means controlled thereby for operating each wheel in order first as a units-wheel, then as a tens-wheel, &c.

16. A numbering-machine having, in combination, a series of numbering-wheels, means for organizing into operativeness successive groups thereof, starting from the first wheel of the series which bears the initial type for all the numbers, and mechanism for actuating the wheels of each group to form consecutive numbers.

17. A numbering-machine having, in combination, a series of numbering-wheels, means for organizing into operativeness successive groups thereof each inclusive of the first wheel which prints the initial digits of the numbers and all the wheels between it and the last of the group, and mechanism for actuating the respective groups for forming consecutive numbers.

18. A numbering-machine having, in combination, a plurality or group of numbering-wheels, mechanism for actuating the same as constant-wheels to form consecutive numbers, means for introducing a new wheel into the group and retiming the remaining wheels, and mechanism for actuating the new group as constant-wheels to form higher consecutive numbers.

19. A numbering-machine having, in combination, a plurality of numbering-wheels for printing consecutive numbers the initial digits whereof are printed from the first wheel, and means for preventing the impression of figures on the wheels following the wheel or wheels which print the desired numbers.

20. A numbering-machine having, in combination, a plurality of numbering-wheels for printing consecutive numbers the initial digits whereof are printed from the first wheel, and means for avoiding impression of figures after the desired numbers comprising drop-type in the second and all following wheels, said drop-type being located in the printing-line but depressed when the wheels are inactive, and means for raising each drop-type to the printing-surface after the wheel is brought into action.

21. A consecutive-numbering machine having, in combination, a plurality of numbering-wheels the first of which bears the type or figures 1 to 9 inclusive while the following wheel or wheels bear the usual ten digit figures inclusive of the cipher, and actuating mechanism operating initially the first wheel and then the first and following wheels in regular order, the first wheel always operating as the wheel of highest denomination of any acting group.

22. A numbering-machine having, in combination, a plurality of numbering-wheels, actuating mechanism therefor, means rendering said mechanism initially inoperative as to all the wheels but the first, automatic means for bringing the wheel or wheels following the first successively into action with the same timing as the initial timing of the first wheel, and means whereby said actuating mechanism actuates all the wheels after they are brought into action.

23. A numbering-machine having, in combination, a plurality of numbering-wheels, actuating mechanism therefor, means rendering said mechanism initially inoperative as to all the wheels but the first, automatic means for bringing the wheel or wheels following the first successively into action, means whereby said actuating mechanism actuates all the wheels after they are brought into action, and means whereby said actuating mechanism changes the timing of all previously-acting wheels every time a new wheel is brought into action.

24. A numbering-machine having, in combination, a plurality of numbering-wheels, all of which following the first are initially inactive, means for introducing said inactive wheels in order into action as units-wheels, and actuating mechanism which constantly actuates the active wheel or wheels.

25. A numbering-machine having, in combination, a plurality of numbering-wheels, all of which following the first are initially inactive, means for introducing said inactive wheels in order into action, and actuating mechanism which constantly actuates the active wheel or wheels, said mechanism changing the timing of the active wheel or wheels every time a new wheel is brought into action.

26. A numbering-machine having, in combination, a plurality of numbering-wheels, means for bringing successively into action the wheels which print the initial, second and successive digits of the numbers, and actuating mechanism which operates the active wheel or wheels.

27. A numbering-machine for printing consecutive numbers having, in combination, a plurality of numbering-wheels having ratchets, actuating-pawls therefor, means rendering the pawls of all but the first wheel bearing the initial type of the numbers initially inoperative, means for bringing the inactive wheels successively into action to print the second and succeeding digits of the numbers, and means concurrently rendering their respective pawls operative.

28. A numbering-machine having, in combination, a plurality of numbering-wheels having ratchets, actuating-pawls therefor, means rendering the pawls of all but the first wheel initially inoperative, means for bringing the inactive wheels successively into action, means concurrently rendering their respective pawls operative, and means changing the timing of action of all previously-acting pawls each time a new wheel is brought into action.

29. A numbering-machine having, in combination, a plurality of numbering-wheels the first of which prints the initial digits of the numbers, said wheels having ratchets, actuating-pawls therefor, means rendering the pawls of all but the first wheel initially inoperative, means for bringing the inactive wheels successively into action, and means causing the respective pawls to actuate said wheels after they are brought into action.

30. A numbering-machine having, in combination, a plurality of numbering-wheels having ratchets, actuating-pawls therefor, means rendering the pawls of all but the first wheel initially inoperative, means for bringing the inactive wheels successively into action, and means causing the respective pawls to actuate said wheels after they are brought into action, the timing of actions of each pawl varying when a new wheel and pawl is brought into action.

31. A numbering-machine having, in combination, a plurality of numbering-wheels, means for bringing them successively into action, starting with the first wheel, actuating mechanism which operates the active wheel or wheels according to a constant periodicity, and means maintaining such periodicity always the same for the last or outermost wheel of any acting group and timing the other wheels in order therefrom according to the series $\frac{1}{10}$, $\frac{1}{100}$, $\frac{1}{1000}$, &c.

32. A numbering-machine having, in combination, a plurality of numbering-wheels, means for bringing them successively into order starting with the first or inner wheel, and actuating mechanism which operates every active group according to a constant periodicity whereof the last or outer wheel is always the one of lowest denomination while the others increase in denomination in order therefrom, the first or inner wheel being always the one of highest denomination.

33. A numbering-machine having, in combination, a plurality of numbering-wheels, means for bringing them successively into order starting with the first or inner wheel, such means being timed to act at the periods of introducing an extra digit into the numbers to be formed, and actuating mechanism which operates every active group according to a constant periodicity whereof the last or outer wheel is always the one of lowest denomination while the others increase in denomination in order therefrom, the first or inner wheel being always the one of highest denomination.

34. A numbering-machine having, in combination, a plurality of numbering-wheels for forming consecutive numbers, means for bringing them into action in order, starting with the first or inner wheel of the group, such means being timed to act at the periods of forming the numbers 10, 100, 1000, &c., and actuating mechanism which operates any active group with the last or outer wheel as the units-wheel, the next as the tens-wheel, and so on.

35. A numbering-machine having, in combination, a plurality of numbering-wheels having ratchets, a series of actuating-pawls therefor which operate different groups of wheels exclusive of the first with the last wheel of the particular group as the units-wheel, the next as the tens-wheel, &c., and means for bringing the wheels successively into action starting from the first or inner wheel.

36. A numbering-machine having, in combination, a plurality of numbering-wheels for forming consecutive numbers, means for increasing the number of active wheels in an outward direction from the wheel which prints the initial digits of the numbers, and actuating mechanism which operates any active wheel or group of wheels for forming consecutive numbers.

37. A numbering-machine having, in combination, a group of numbering-wheels for forming consecutive numbers, said wheels having ratchets with deep notches, a corresponding plurality of actuating-pawls of successively longer lengths from the first or inner one, whereby the pawl for any acting wheel adjacent to another outer acting wheel can only engage its ratchet when the pawl for said outer wheel engages in the deep notch of its ratchet, means for bringing the wheels into action in order starting from the first, and means rendering the pawls for any and all inactive wheels inoperative with respect thereto.

38. A numbering-machine having, in combination, a group of numbering-wheels having mutilated ratchets and dormant teeth adapted to appear or come into being in the vacant spaces thereof, means for bringing the wheels into action and the said dormant teeth into being, and a series of actuating-pawls which move inoperatively in the vacant spaces of the respective ratchets prior to the appearance of the dormant teeth.

39. A numbering-machine having, in combination, a group of numbering-wheels having mutilated ratchets and dormant teeth adapted to appear or come into being in the interrupted spaces thereof, means for bringing the wheels successively into action and the dormant teeth into being, a series of actuating-pawls which move inoperatively in the interrupted spaces of the respective ratchets prior to the appearance of the dormant teeth, and means controlling the timing of any acting wheel or number of wheels of the group to form consecutive numbers.

40. A numbering-machine having, in combination, a group of numbering-wheels having mutilated ratchets and dormant teeth adapted to appear or come into being in the interrupted spaces thereof, means for bringing the wheels successively into action and the dormant teeth into being, a series of actuating-pawls which move inoperatively in the interrupted spaces of the respective ratchets prior to the appearance of the dormant teeth, and means controlling the timing of the engagement of the actuating-pawls for any acting number of wheels of the group to form consecutive numbers.

41. A numbering-machine having, in combination, a group of numbering-wheels having mutilated ratchets and dormant teeth adapted to appear or come into being in the interrupted spaces thereof, means for bringing the wheels successively into action and the dormant teeth into being, a series of actuating-pawls which move inoperatively in the interrupted spaces of the respective ratchets prior to the appearance of the dormant teeth, and means controlling the timing of the engagement of the actuating-pawls for any acting number of wheels of the group to form consecutive numbers, such means comprising successively greater lengths of the pawls and deep notches in the several ratchets.

42. A numbering-machine having, in combination, a group of numbering-wheels having ratchets, each with one deep notch and an interrupted space and means for supplying the said interrupted space, means for bringing the wheels into action in order, and a corresponding group of actuating-pawls of different lengths which move inoperatively in the interrupted spaces of the ratchets before such spaces are supplied.

43. A numbering-machine having, in combination, a group of numbering-wheels having ratchets, each with one deep notch and an interrupted space and means for supplying the said interrupted space, means for bringing the wheels into action in order, and a corresponding group of actuating-pawls which move inoperatively in the interrupted spaces of the ratchets before such spaces are supplied, the arrangement of said pawls being such that each when operative holds the preceding one out of engagement with its ratchet except when the former engages in the deep notch of its ratchet.

44. A numbering-machine having, in combination, a group of numbering-wheels having mutilated ratchets whereof two spaces are interrupted and dormant teeth adapted to appear and supply one interrupted space, means for bringing the wheels into action and the dormant teeth into being, and a series of actuating-pawls which move inoperatively in the interrupted spaces before the appearance of the dormant teeth.

45. A numbering-machine having, in combination, a group of numbering-wheels having ratchets, each with two contiguous interrupted spaces and means for restoring one of such spaces, means for bringing the wheels into action in order, and a corresponding group of actuating-pawls of different lengths which move inoperatively in the interrupted spaces of the ratchets before the respective wheels come into action.

46. A numbering-machine having, in combination, a group of numbering-wheels having ratchets, each with two contiguous interrupted spaces and means for restoring one of such spaces, means for bringing the wheels into action in order, and a corresponding group of actuating-pawls which move inoperatively in the interrupted spaces of the ratchets before the respective wheels come into action, the arrangement being such that each pawl when operative holds the preceding one out of engagement with its ratchet except when the former engages in the deep notch of its ratchet.

47. In a numbering-machine, a numbering-wheel having a ratchet with an interrupted space and a dormant tooth adapted to supply the same.

48. In a numbering-machine, a numbering-wheel having an interrupted space substantially equivalent to two notches and a dormant tooth adapted to supply one notch and leave one deep notch.

49. A numbering-machine having, in combination, a series of numbering-wheels for forming consecutive numbers, wheel-ratchets of which the second and all following have an interrupted space and a dormant tooth adapted to supply the same, means for bringing the wheels successively into action and the respective dormant teeth into being, and a series of actuating-pawls which move inoperatively in the interrupted ratchet-spaces before appearance of the dormant teeth but engage said ratchets after such teeth have appeared, and means controlling the timing of the wheels of any active group to form consecutive numbers.

50. A numbering-machine having, in combination, a series of numbering-wheels for forming consecutive numbers, wheel-ratchets of which the second and all following have an interrupted space and a dormant tooth adapted to supply the same, means for bringing the wheels successively into action and the respective dormant teeth into being, and a series of actuating-pawls which move inoperatively in the interrupted ratchet-spaces before appearance of the dormant teeth but engage said ratchets after such teeth have appeared, and means whereby the pawl of any acting wheel is held from contact with its ratchet except once per complete rotation of the adjacent wheel of next lower denomination.

51. A numbering-machine having, in combination, a series of numbering-wheels for forming consecutive numbers, wheel-ratchets of which the second and all following have an interrupted space of approximately two teeth or notches and a dormant tooth adapted to supply the space of one tooth or notch and leave a deep notch, means for bringing the wheels into action in order and the respective dormant teeth into being, and a series of actuating-pawls of which the second and following ones travel inoperatively in the interrupted ratchet-spaces before appearance of the respective dormant teeth, and means whereby each acting pawl is held from contact with its ratchet except when the following pawl engages in the deep notch of its ratchet.

52. In mechanism of the character described, a numbering-wheel having an interrupted space, a dormant tooth adapted to supply the same, and means for bringing such tooth into being when the wheel first comes into action.

53. In mechanism of the character described, a numbering-wheel having an interrupted space, a dormant tooth adapted to supply the same, and means for bringing such tooth into being operated by the initial turn of the wheel.

54. In mechanism of the character described, a numbering-wheel having an interrupted space, a dormant tooth adapted to supply the same, a drop-type, and means actuated by the rise of the drop-type for causing appearance of the dormant tooth.

55. In mechanism of the character described, a numbering-wheel having an interrupted space, a dormant tooth adapted to supply the same, a drop-type, and means actuated by the rise of the drop-type for causing appearance of the dormant tooth, comprising a rod extending from the drop-type and movably fitted in a hole in the dormant tooth inclined to its direction of movement.

56. In mechanism of the character described, a numbering-wheel having an interrupted space, a dormant tooth adapted to supply the same, a drop-type, and means acting concurrently with its rise to cause appearance of the dormant tooth.

57. A numbering-machine having, in combination, a plurality of numbering-wheels for forming consecutive numbers, actuating mechanism therefor, means rendering such mechanism inoperative with respect to the several wheels before they are brought into action, and mechanism for bringing the wheels in order into action comprising an engaging means acting between the last acting wheel of any group and the adjacent inactive wheel at the periods necessary for increasing the number of active wheels, and means for actuating each new wheel brought into action as the units-wheel.

58. A numbering-machine having, in combination, a plurality of numbering-wheels of which the first has nine type and each of the following ones ten type including the cipher, transversely-movable pins in said wheels spring-held to project to their inner sides but adapted to be forced to project to the outer sides and alined when the nines of all the wheels are on the printing-line, the adjacent ends of said pins having opposed catches the backs of which are rounded or beveled, the adjacent ends of any two pins being adapted to engage when such pins project from opposite sides of their respective wheels, and a fixed surface adapted to engage and force outward the pin in the first wheel when its nine is up; and mechanism for actuating the first or any group of wheels.

59. In a numbering-machine, the combination with a reciprocatory plunger, of a pawl-carrying swing, and a link pivotally connecting the swing and plunger.

60. In a numbering-machine, the combination of numbering-wheels, actuating-pawls adapted for operating said wheels to form consecutive numbers, an oscillating pawl-carrying swing, a vertically-reciprocating plunger, and a link pivotally connecting said plunger and swing, the pivotal connection between the link and swing oscillating through an arc transverse to the vertical oscillation of the pivotal connection between the link and plunger.

61. In a typographic numbering-machine, the combination of a box having a vertical chamber at one end, a plurality of numbering-wheels in said box mounted loosely on a center shaft, an oscillating swing hung on said shaft, pawls carried thereby adapted for operating said wheels to print consecutive numbers, a vertically-reciprocating plunger working in said chamber and actuated by the action of the press, and a link pivotally connecting said plunger and swing, said link being arranged in the plunger-chamber, and the inner wall of said chamber having an arc slot to accommodate the pivot-pin between the link and swing.

62. A numbering-machine for printing consecutive numbers by increasing the digits from left to right and having, in combination, a plurality of coaxial numbering-wheels, wheel-ratchets therefor, the second and all following ratchets having a vacant or interrupted space embracing two notches, drop-type in the second and following wheels which are alined and depressed at the start, dormant teeth in said second and following wheels adapted to supply the place of one notch or space when brought into being, an oscillating swing carrying a plurality of actuating-pawls for the respective ratchets, said pawls being of successively longer lengths beginning from the first, the second and all following pawls moving inoperatively in interrupted spaces of the second and following ratchets prior to the coming of said wheels into action, automatic means for introducing the second and following wheels into action successively at periods of increasing the number of digits in the numbers to be printed, means for raising the drop-type, and automatic means for causing the forthcoming of each dormant tooth as its wheel comes into action, leaving one deep notch in said wheel.

63. A numbering-machine having, in combination, a plurality of coaxial numbering-wheels, wheel-ratchets therefor of which the second and following ones have deep notches, an oscillating swing carrying a plurality of actuating-pawls for the respective ratchets, said pawls being of successively longer lengths from the first, the second and following ratchets having interrupted spaces in which the respective pawls can move inoperatively when the respective wheels are inactive, and means for introducing the second and following wheels into action and supplying the interrupted spaces of their respective ratchets at the completion of every rotation of the first wheel.

64. A numbering-machine having, in combination, a plurality of coaxial numbering-wheels, wheel-ratchets therefor of which the second and following ones have deep notches, an oscillating swing carrying a plurality of actuating-pawls for the respective ratchets, said pawls being of successively longer lengths from the first, the second and following ratchets having interrupted spaces in which the respective pawls can move inoperatively when the respective wheels are inactive, the said second and following wheels having drop-type which are alined and depressed at the outset, dormant teeth in said second and following wheels actuated to supply the respective ratchets by the rise of the respective drop-type as the wheels are turned, and means whereby each wheel at the completion of its action as a units-wheel effects a turning of the next outer wheel.

65. A numbering-machine having, in combination, a plurality of numbering-wheels, and actuating mechanism for operating said wheels in regular order as units-wheels and the previously-acting wheel or wheels as a wheel or wheels each of one higher denomination, said mechanism comprising a swing carrying successively longer pawls and wheel-ratchets of which the second and following wheels have deep notches and means for preventing effective engagement of the second and following pawls with their respective ratchets prior to a predetermined number of movements of the swing.

66. A numbering-machine having, in combination, a plurality of numbering-wheels, transversely-movable pins in said wheels initially projecting at their inner sides but adapted to be forced to project to their outer sides, the adjacent ends of said pins having opposed catches the backs of which are rounded or beveled, a fixed surface adapted to engage and force outward the first wheel's pin at the completion of every rotation thereof, whereby an effective engagement is established successively between adjacent pairs of wheels at the successive completions of rotation of the first, and mechanism for actuating any wheel or group of wheels in the order in which they are brought into action to form consecutive numbers.

67. In numbering-machine mechanism, the combination of a numbering-wheel, a movable drop-type therein, a dormant tooth therein, means for raising said drop-type, and means for bringing said dormant tooth into effective action comprising a rod carried by said drop-type having a part extending at an angle to the direction of movement of the drop-type and slidably fitted in a hole therefor in said dormant tooth.

68. In numbering-machine mechanism, the combination of a numbering-wheel, a movable drop-type carried thereby, means for raising said drop-type, a coöperative instrumentality carried by the wheel, and connections for actuating the same by the rise of the drop-type.

69. In numbering-machine mechanism, the combination of a numbering-wheel, a movable drop-type carried thereby, means for raising said drop-type, an instrumentality carried by the wheel and movable at an angle to the movement of the drop-type, and actuating means therefor comprising a connecting device between the said drop-type and said instrumentality having a sliding engagement with one of these parts inclined to the direction of movement of said part.

70. In numbering-machine mechanism, the combination of a supporting-shaft, a number-wheel mounted thereon, a movable type-block carried thereby and movable tangentially with respect to said shaft, and a movable dormant tooth carried by the wheel at the same side of the shaft as the inner end of the type-block, and a connection between said type-block and dormant tooth having a sliding engagement with one of these parts inclined to the direction of its movement.

In testimony whereof I affix my signature in presence of two witnesses.

CURTISS F. SMITH.

Witnesses:
HARRIET SANFORD SMITH,
ADOLPHE A. GAZAN.